United States Patent [19]

Mussman et al.

[11] Patent Number: 5,796,795
[45] Date of Patent: Aug. 18, 1998

[54] DATA TRANSFERRING CIRCUIT WHICH ALIGNS CLOCK AND DATA

[75] Inventors: Harry Edward Mussman, Bedford, Mass.; Hung-San Chen, Petaluma, Calif.; Stephen P. Hartman, Jericho, Vt.

[73] Assignee: GTE Laboratories Incorporated, Waltham, Mass.

[21] Appl. No.: 347,618

[22] Filed: Nov. 30, 1994

[51] Int. Cl.$^6$ .................... H04L 25/36; H04L 25/40; H04L 7/00

[52] U.S. Cl. .................. 375/372; 375/354; 375/357; 370/517; 370/357; 370/388; 370/398; 327/153; 327/162; 327/165

[58] Field of Search .................. 327/141, 152, 327/153, 154, 160, 161, 162, 165; 375/354, 355, 357, 371, 372, 362; 370/100.1, 108, 105.1, 105.2, 63, 505, 517, 357, 388, 398, 422

[56] References Cited

U.S. PATENT DOCUMENTS

| | | |
|---|---|---|
| 4,763,317 | 8/1988 | Lehman et al. . |
| 4,821,034 | 4/1989 | Anderson et al. ............ 340/825 |
| 4,999,832 | 3/1991 | Chen et al. . |
| 5,033,044 | 7/1991 | Williams et al. . |
| 5,052,025 | 9/1991 | Duff et al. . |
| 5,081,654 | 1/1992 | Stephenson, Jr. et al. . |
| 5,115,455 | 5/1992 | Samaras et al. ............ 375/354 |
| 5,268,935 | 12/1993 | Mediavilla et al. ............ 375/372 |
| 5,268,936 | 12/1993 | Bernady . |
| 5,337,334 | 8/1994 | Molloy ............ 375/372 |
| 5,339,311 | 8/1994 | Turner ............ 370/394 |
| 5,367,518 | 11/1994 | Newman . |
| 5,416,773 | 5/1995 | Gamm . |
| 5,440,591 | 8/1995 | Liron et al. ............ 375/354 |
| 5,452,297 | 9/1995 | Hiller et al. . |
| 5,461,622 | 10/1995 | Bleickard et al. . |
| 5,541,917 | 7/1996 | Farris . |
| 5,550,874 | 8/1996 | Lee ............ 375/354 |
| 5,557,610 | 9/1996 | Calamvokis et al. . |
| 5,592,477 | 1/1997 | Farris et al. ............ 370/396 |

OTHER PUBLICATIONS

"A Wide-Band Local Access System Using Emerging-Technology Components" Lloyd R. Linnell; Jul. 1986; pp. 612–618.

"ICC '93 Geneva", Woodward, Helmes, Mussman, Walker, Ulbricht and Casey; May 1993; pp. 853–857.

"Optical Communications" ACCESS; Harry Mussman; Spring 1993; p. 23.

"Network Architectures For Digital Video Delivery Service In Mid-1990S", Bahman Amin-Salehi and Martin Kerner; 1992; pp. 1758–1762.

(List continued on next page.)

Primary Examiner—Wellington Chin
Assistant Examiner—Jean B. Corrielus
Attorney, Agent, or Firm—Leonard C. Suchyta

[57] ABSTRACT

A network (10) includes a broadband customer service module (B-CSM) (20). The B-CSM (20) includes a plurality of feeder interface cards (FICs) (36) and optical line cards (OLCS) (38) which are coupled together through a midplane assembly (34) so that each FIC (36) couples to all OLCs (38) and each OLC (38) couples to all FICs (36) through junctor groups (68). The B-CSM (20) interfaces many OC-12 SONET feeders to many OC-12 SONET lines. Within the B-CSM (20) circuit switching is performed electrically at an STS-1 rate. A reference clock which oscillates at a frequency lower than the data rate is routed with payload data so that it receives delays similar to those imposed on the payload data due to processing. At second stage switching fabrics (50) where data need to be extracted from signals flowing within the B-CSM (20), a clock regeneration circuit (32) generates a master clock signal oscillating at twice the data rate and phase synchronized to a delayed reference clock. A geometric compensation scheme corrects for timing skew which occurs when clocks and data are distributed to points or small areas from widely dispersed locations, and when clocks and data are distributed from points or small areas to widely dispersed locations.

26 Claims, 6 Drawing Sheets

OTHER PUBLICATIONS

"An Architecture For Interactive Applications", Alexander D. Gelman and Lanny S. Smoot; 1993; pp. 848–852.

"A Two–Stage Rearrangeable Broadcast Switching Network", Gaylord W. Richards and Frank K. Hwang; 1985; pp. 1025–1035.

"Physical Design Issues For Very Large ATM Switching Systems", Young, Banwell, Cheng, Estes, Habiby, Hayward, Helstern, Lalk, Mahoney and Wilson; 1990; pp. 1590–1593.

"A New Architecture For Packaging Wideband Communication Equipment Using A 3–D, Orthogonal Edge–To–Edge Topology", Wilson; 1988; 430–43.

DATA TRANSFERRING CIRCUIT WHICH ALIGNS CLOCK AND DATA

TECHNICAL FIELD OF THE INVENTION

The present invention relates generally to systems which process digital data. More specifically, the present invention relates to the high speed processing of synchronous data, such as may occur in a switch for a broadband network.

BACKGROUND OF THE INVENTION

Networks transfer electronic information between different locations. Broadband networks differ from other networks in that they transfer a relatively large amount of information during each unit of time. Future broadband networks are expected to convey video signals for business, educational and residential applications. Such networks may provide services such as broadcast-like video distribution, individual access to video program libraries, video telephone, video conferencing, and the like. Any one of such services may, for example, communicate signals having data transfer rates of up to 50 Mb/s or more.

In order to effectively serve a large number of customers, a broadband network includes switching nodes. At switching nodes, broadband signals are routed along selected paths so that desired signals are delivered from signal sources to targets.

Numerous problems are faced by a broadband, real-time switch that accommodates a large number of connections. These problems result, at least in part, from the high data transfer rates associated with broadband communications. In short, a tremendous amount of data need to be processed or otherwise transferred through the switch during every unit of time, and the larger the number of connections supported by the switch, the greater the amount of data which need to be processed.

At broadband data rates, every data signal path within the switch acts like a transmission line having a delay proportional to its length and being subject to interference from signals which can cause timing or phase distortions. Thus, each data signal transferred through the switch has an optimum bit synchronization timing arrangement which defines when data can most reliably be extracted from the data signal's path. Moreover, this timing may vary from signal to signal, depending upon the physical connection path a given data signal follows through the switch at any given moment. If a clock signal is used to define bit timing for the signals, then the clock signal also experiences its own such distortions. Thus, optimal clocking in spite of timing distortions in data and clock paths is difficult to achieve over a large number of connections.

Furthermore, physically larger switches experience worse timing distortions because physically larger switches have longer signal paths. Propagation delays vary from signal to signal and clock to clock through switch fabric components and/or the transmission line signal paths that interconnect the components.

One conventional solution to the timing problem is to extract a clock signal from each data signal path at the points in the switch where the data need to be extracted. However, this solution is undesirably complex because it requires one or more clock recovery circuits associated with each data signal path, and the complexity increases as the number of connections increases. Consequently, this solution leads to decreased reliability and increased cost. Moreover, the increased complexity necessitated by an excessive number of clock recovery circuits requires physical switch power consumption and implementation space to increase, and these increases further exacerbate the timing problem.

Another conventional solution to the timing problem is to process data in parallel rather than serially. For example, rather than switch single-bit serial data streams at a bit rate, a "parallel" switch can switch two-bit serial data streams at one-half the bit rate to achieve the same data throughput or more than two-bit serial streams at even lower bit rates to achieve the same data throughput. Unfortunately, this solution increases complexity by requiring proportionally more at least twice the number of components and interconnections, and it further exacerbates the timing problem by requiring proportionally more physical implementation space.

SUMMARY OF THE INVENTION

Accordingly, it is an advantage of the present invention that an improved data transferring circuit which aligns a clock and data is provided.

Another advantage is that the present invention provides a data transferring circuit which may be implemented in a small space.

Another advantage is that the present invention provides a data transferring circuit that may operate at high data rates.

Another advantage is that the present invention provides a broadband switch.

Another advantage is that the present invention provides a broadband switch which may accommodate a large number of connections.

Another advantage is that the present invention provides a broadband switch which accommodates simple and straight forward engineering.

The above and other advantages of the present invention are carried out in one form by a data transferring circuit for maintaining alignment between clock and data. The circuit includes input means for receiving first data at a data rate. A clock source is configured to provide a reference clock which oscillates at a frequency less than this data rate. Output means present second data at substantially this data rate. A data processor transforms the first data and the reference clock into the second data and a second reference clock. A clock regenerator couples to the data processor and the output means. The clock regenerator generates a clock signal which oscillates substantially at the data rate and is synchronized to the second reference clock. This clock signal clocks the second data into the output means.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
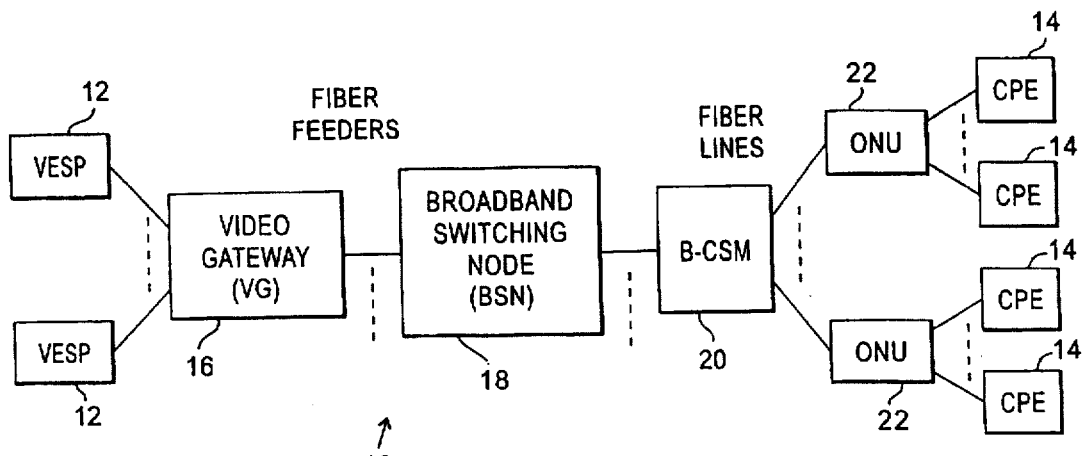
FIG. 1 shows a block diagram of a broadband network with which a broadband customer service module (B-CSM) configured in accordance with the present invention may operate.

FIG. 1 shows a block diagram of a broadband network 10. Any number of video enhanced service providers (VESPS) 12 and any number of customer premise equipment (CPE) 14 may couple to and communicate through network 10. VESPs 12 may, for example, provide broadcast-like video services, where video from a single source is "broadcast" to many targets, or VESPs 12 may provide video program libraries which customers may access on demand. Such broadcast-like services are expected to be in high demand, and in the preferred embodiments network 10 accommodates a greater amount of downstream traffic (i.e. toward CPEs 14) than upstream traffic (i.e. away from CPEs 14). Network 10 primarily transports digital data. Conventional codex equipment (not shown) may be used to convert NTSC-compatible and HDTV video into digital streams.

VESPs 12 couple to network 10 through one or more video gateways 16. Gateways 16 couple through any number of broadband switching nodes 18 to any number of broadband customer service modules (B-CSMs) 20, and B-CSMs 20 couple to CPEs 14 through optical network units (ONUs) 22.

Network 10 is a fiber optic network, with optical signals being demultiplexed and converted into electrical signals (and vice versa) in ONUs 22. ONUs 22 couple to CPEs 14 through coax cables, and each ONU 22 serves a few, for example three, CPEs 14 for each optical line. Fiber optic lines couple ONUs 22 to B-CSMs 20, and fiber optic feeders couple B-CSMs 20 to upstream network nodes, such as switching nodes 18. In the preferred embodiment, the fiber optic lines and feeders conform to well known SONET OC-12 protocols. In a preferred embodiment, each B-CSM 20 may serve up to 288 fiber lines, with each line conveying 12 STS-1 51.84 Mb/s channels. In addition, each B-CSM 20 may support up to 288 SONET OC-12 downstream feeders and up to 72 SONET OC-12 upstream feeders. Accordingly, B-CSMs 20 may accommodate a large number of connections, with STM circuit switching being performed at an STS-1 rate.

Signalling from CPEs 14 to network 10 is accomplished via a SONET datacom channel in the line operating at around 576 Kb/s using a variation of the Q.921 and Q.931 protocols. The variations of the Q.931 protocol included in network 10 include a MODIFY message to which B-CSM 20 responds with any acknowledgement and often without further network involvement. The MODIFY message applies when a customer is currently receiving a broadcast-like video service. It specifies a new broadcast-like video channel to receive. When B-CSM 20 receives a MODIFY message from a CPE 14, it controls its switching circuits to route the new channel to the CPE 14 and then returns an acknowledgement after the new channel has been connected. Switching time improves because this process is quicker than the conventional disconnect sequence of messages followed by the conventional connect sequence of messages. Also, the switching time often improves because further network involvement such as rebuilding a new connection can often be omitted if the new channel is already available at a B-CSM 20, having already been provided by the network to the B-CSM 20 for connection to another CPE 14. When the new channel is already available at the B-CSM 20, the B-CSM 20 routes it to the CPE 14 from the switching circuit that is most closely associated with the CPE 14 so as to minimize the switching circuit resources that are used to make the connection.

While the teaching of the present invention may apply to different types of nodes in network 10, the following description focuses upon a preferred embodiment of a B-CSM 20. B-CSM 20 may be viewed as analogous to a local switching system or a remote local switching module for the current voice network because B-CSM 20 in network 10 is the first switch away from customer equipment in a hierarchy of switches.

Figure 2:
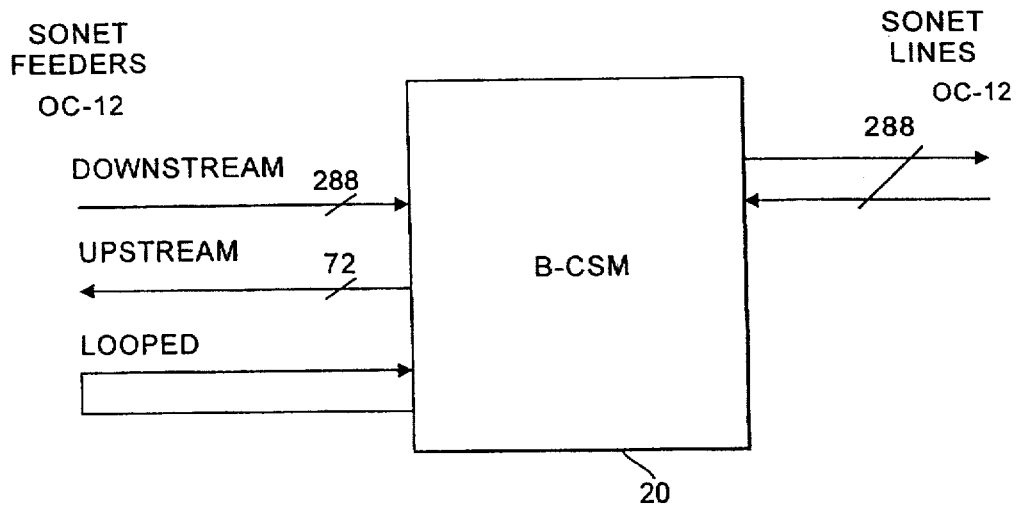
FIG. 2 shows a block diagram depicting an external configuration for the broadband customer service module.

FIG. 2 shows a block diagram depicting an external configuration for the preferred embodiment of B-CSM 20. Up to 288 OC-12 SONET bidirectional fiber lines may couple B-CSM 20 to various ONUs 22 (see FIG. 1). Up to 288 downstream OC-12 SONET fiber feeders and up to 72 upstream OC-12 SONET fiber feeders may couple B-CSM 20 to various broadband switching nodes 18 (see FIG. 1), or other upstream network nodes. However, a portion of the upstream feeders may be looped back to downstream feeders at B-CSM 20 so that line-to-line connections may be switched entirely within B-CSM 20. Even if upstream feeders are not looped back to downstream feeders, line-to-line connections downstream of B-CSM 20 may take place through looping which may take place further upstream.

Figure 3:
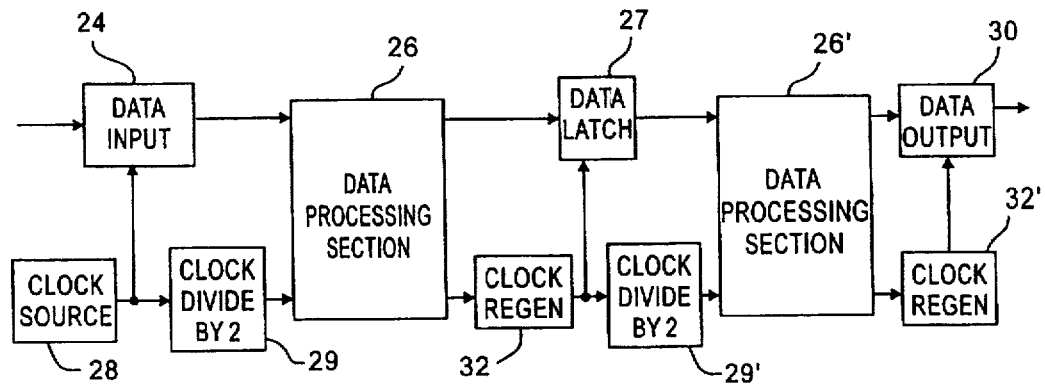
FIG. 3 shows a high level block diagram of the broadband customer service module.

FIG. 3 shows a high level block diagram of a B-CSM 20. As illustrated in FIG. 3, B-CSM 20 has data inputs 24 at which SONET data from a SONET line are received and demultiplexed into individual STS-1 data streams. These data are passed to data processing sections 26 and 26', each of which process the data and impose some delay on the data as a consequence, although not necessarily an intended or desired consequence, of the processing. B-CSM 20 also has data outputs 30 at which multiplexed STS-1 data streams are received and multiplexed into SONET data for a SONET line. As discussed above, B-CSM 20 includes data inputs for both upstream and downstream directions. In the preferred embodiment of the present invention, the data processing corresponds to circuit switching, and more precisely to circuit switching which takes place in a two stage space switch arrangement, with the two stages corresponding to data processing sections 26 and 26', respectively. Portions of input data are switched into portions of output data. However, other types of data processing activities also impose delays while processing data and can benefit from the teaching of the present invention.

A clock source 28 produces a full-rate clock which oscillates at a frequency which is the same as the data rate. In other words, the full-rate clock undergoes one full cycle between high and low states in one datum period, baud, or symbol. The full-rate clock is used to clock data out of the data inputs 24, and it connects to a clock divide by two circuit 29 which produces a half-rate clock reference. In the preferred embodiment, this half-rate clock reference oscillates at one-half the data rate so that it resembles an alternating stream of ones and zeros occurring at the data rate. In other words, the reference clock changes state only once for each datum period, baud, or symbol. This arrangement contrasts with conventional digital circuits where clocks may operate at a data rate, change state twice per datum period, baud, or symbol, and operate as a clock for the data streaming through a processor at the data rate. Clock divide by two circuit 29 couples to the input of data processing section 26, where the reference clock joins the data from data input 24. Then, data processing section 26 processes the reference clock along with the input data so that the reference clock receives approximately the same delay as may be imposed upon the data.

In the preferred embodiment, data processing section 26 is implemented using standard CMOS design practices. The data rate is STS-1, or 51.84 Mb/s. The reference clock's frequency is 25.93 Mc/s so that the reference clock is a stream of alternating ones and zeros at the STS-1 rate.

A data output of data processing section 26 couples to a data latch 27 so that the processed and delayed, and in this case the switched, data are presented to an input of a data latch 27. The delayed clock reference output from data processing section 26 couples to a clock regeneration (regen) circuit 32. Clock regeneration circuit 32 is a phase locked loop circuit that regenerates a master clock signal which is at twice the frequency of the data rate and is phase synchronized to the delayed reference clock. This master clock couples to a clock input of data latch 27 so that the master clock clocks the processed data into data latch 27. By having the reference clock and the data experience approximately the same delays through data processing section 26 and by regenerating a master clock from the delayed reference clock, bit synchronization for extracting data at data latch 27 may be maintained.

This data transfer process from data input 24 through data processing section 26 to data latch 27 is repeated from data latch 27 through data processing section 26' to data output 30. Once again, a half-rate clock reference is created by a clock divide by two circuit 29' and carried through data processing section 26' along with the data. A full-rate master clock is then regenerated by clock regeneration circuit 32'.

Figure 4:
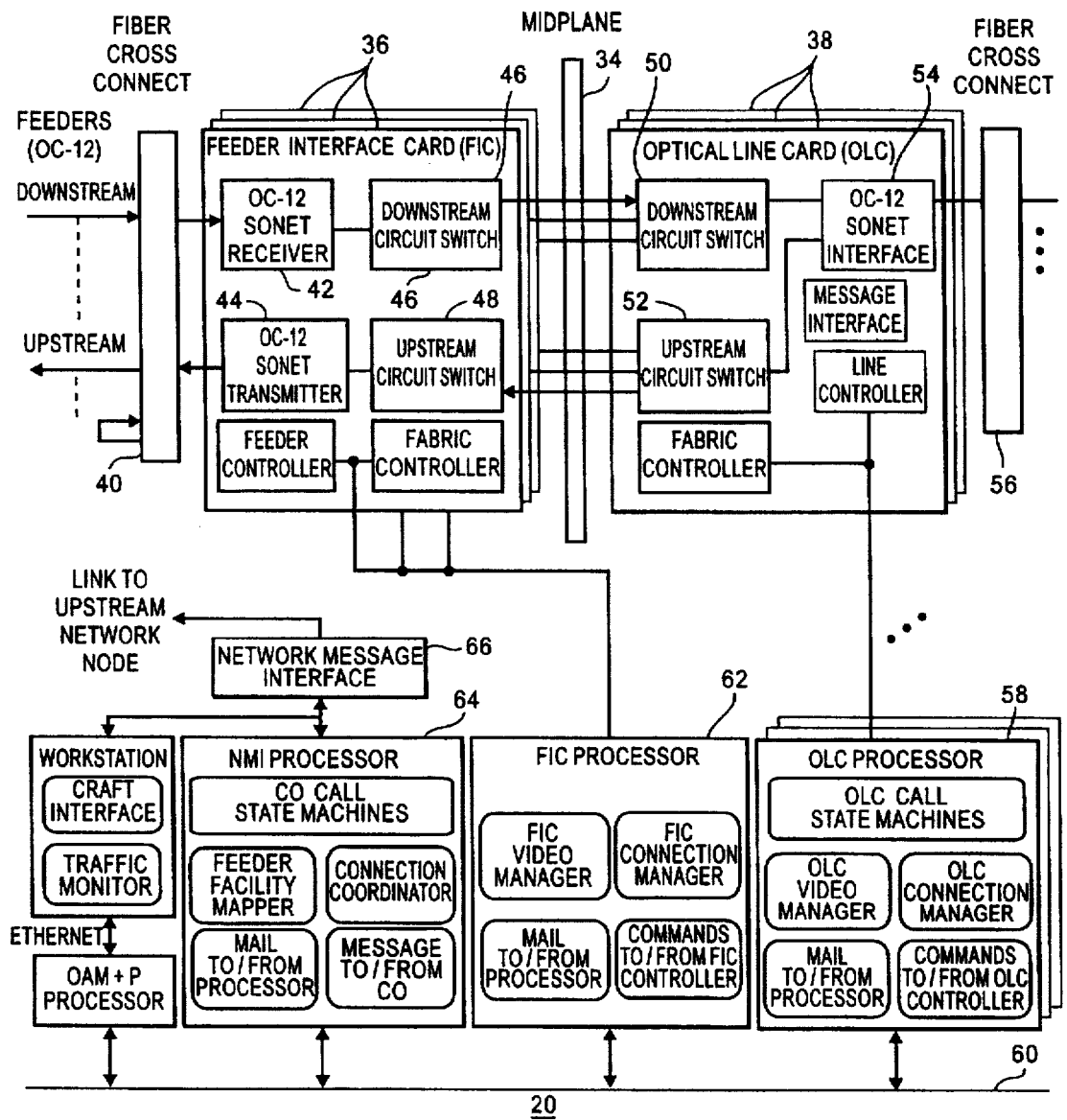
FIG. 4 shows a more detailed block diagram of the broadband customer service module.

FIG. 4 shows a more detailed block diagram of B-CSM 20. B-CSM 20 is configured upon a midplane assembly 34 which arranges a plurality of feeder interface cards (FICs) 36 substantially perpendicular to a plurality of optical line cards (OLCs) 38. Each FIC 36 couples to every OLC 38 at connection points through junctor groups between the FIC 36 and respective OLCs 38. Likewise, each OLC 38 couples to every FIC 36 at connection points through junctor groups.

Downstream feeders couple through a fiber cross connect 40 to OC-12 SONET receivers 42 on each FIC 36. OC-12 SONET transmitters 44 on each FIC 36 couple through cross connect 40 to upstream feeders. Receiver 42 and transmitter 44 couple through downstream and upstream circuit switch fabrics 46 and 48 and midplane assembly junctor groups to downstream circuit switch fabrics 50 and upstream circuit switch fabrics 52, respectively. Downstream and upstream circuit switches 50 and 52 on OLCs 38 couple through an OC-12 SONET interface 54 and a fiber cross connect 56 to the ONU 22 downstream lines (see FIG. 1). Those skilled in the art will appreciate that for downstream signals, switch fabrics 46 provide first stage switching and switch fabrics 50 provide second stage switching. Likewise, for upstream signals, switch fabrics 52 provide first stage switching and switch fabrics 48 provide second stage switching. Of course, between each first stage and second stage numerous junctors connect many switch fabrics to many other switch fabrics.

In the preferred embodiment, midplane assembly 34 supports up to 18 of FICs 36 and up to 18 of OLCs 38. Up to 9072 junctors perform the interconnections between switching stages. Each FIC 36 is desirably identical to the other FICs 36, and each OLC 38 is desirably identical to the other OLCs 38. Thus, for design, manufacturing, inventory, engineering, troubleshooting, and maintenance, cost savings result from having fewer modules with which to contend. These junctors are arranged into up to 324 junctor groups. Each junctor group supports up to 24 downstream junctors and 4 upstream junctors. Consequently, B-CSM 20 accommodates up to 3456 STS-1 downstream connections and up to 864 STS-1 upstream connections.

OLC processors 58 couple to corresponding OLCs 38 through, for example, well known VSB busses. Likewise OLC processors 58 couple to a multiprocessor bus 60, such as the well-known VME bus. OLC processors 58 evaluate in-band signalling extracted from SONET lines, and control circuit switching taking place in OLCs 38. Signalling which cannot be resolved within OLC processors 58 and OLCs 38 is packetized and transmitted over bus 60. A FIC processor 62 couples to multiprocessor bus 60 and to all FICs 36. FIC processor 62 controls switching taking place in FICs 36. A network message interface (NMI) processor 64 responds to signalling packets and transfers such signalling upstream through a network message interface 66.

Figure 5:
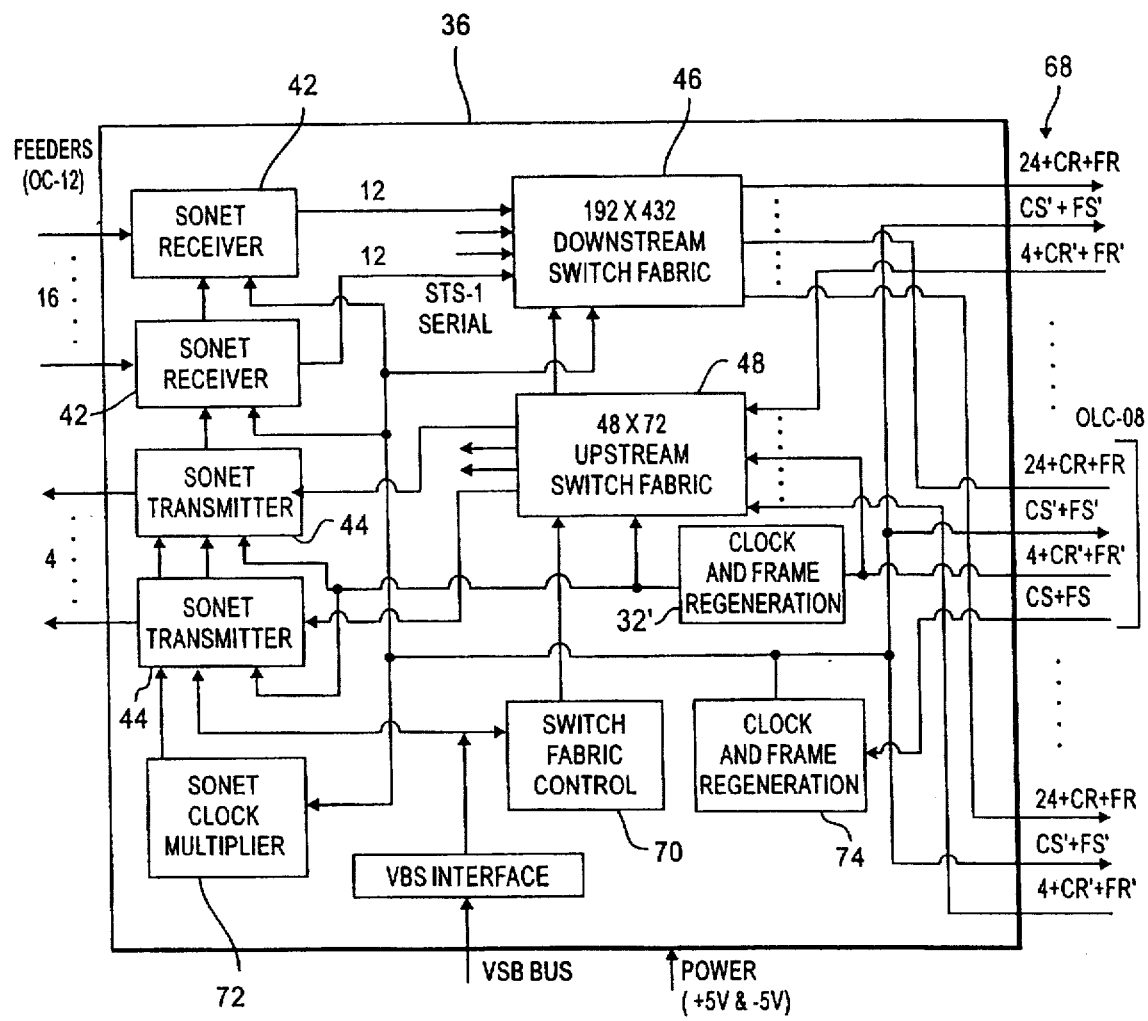
FIG. 5 shows a block diagram of a feeder interface card (FIC)

FIG. 5 presents a block diagram which illustrates a feeder interface card (FIC) 36 in more detail. Each FIC 36 may include several OC-12 SONET receivers 42, up to 16 in the preferred embodiment. Likewise, FIC 36 includes several OC-12 SONET transmitters 44, up to 4 in the preferred embodiment. Receivers 42 demultiplex STS-1 channels from the SONET feeders, convert the data into electrical signals, and couple the individual STS-1 channels to inputs of downstream switch fabric 46, which is configured as a 192×432 fabric in the preferred embodiment. Output signals from switch fabric 46 are routed through junctor groups 68, through which they pass to all OLCs 38 (see FIG. 4).

SONET transmitters 44 multiplex the STS-1 channels they receive from upstream switch fabric 48 into SONET optical signals for transmission over the upstream feeders. In the preferred embodiment, upstream switch fabric 48 is configured as a 48×72 fabric which receives four signals from OLCs 38 through each of 18 junctor groups 68. The configuration of switching occurring through fabrics 46 and 48 from moment to moment is controlled through a switch fabric control block 70, which is controlled by FIC processor 62 (see FIG. 4).

Figure 6:
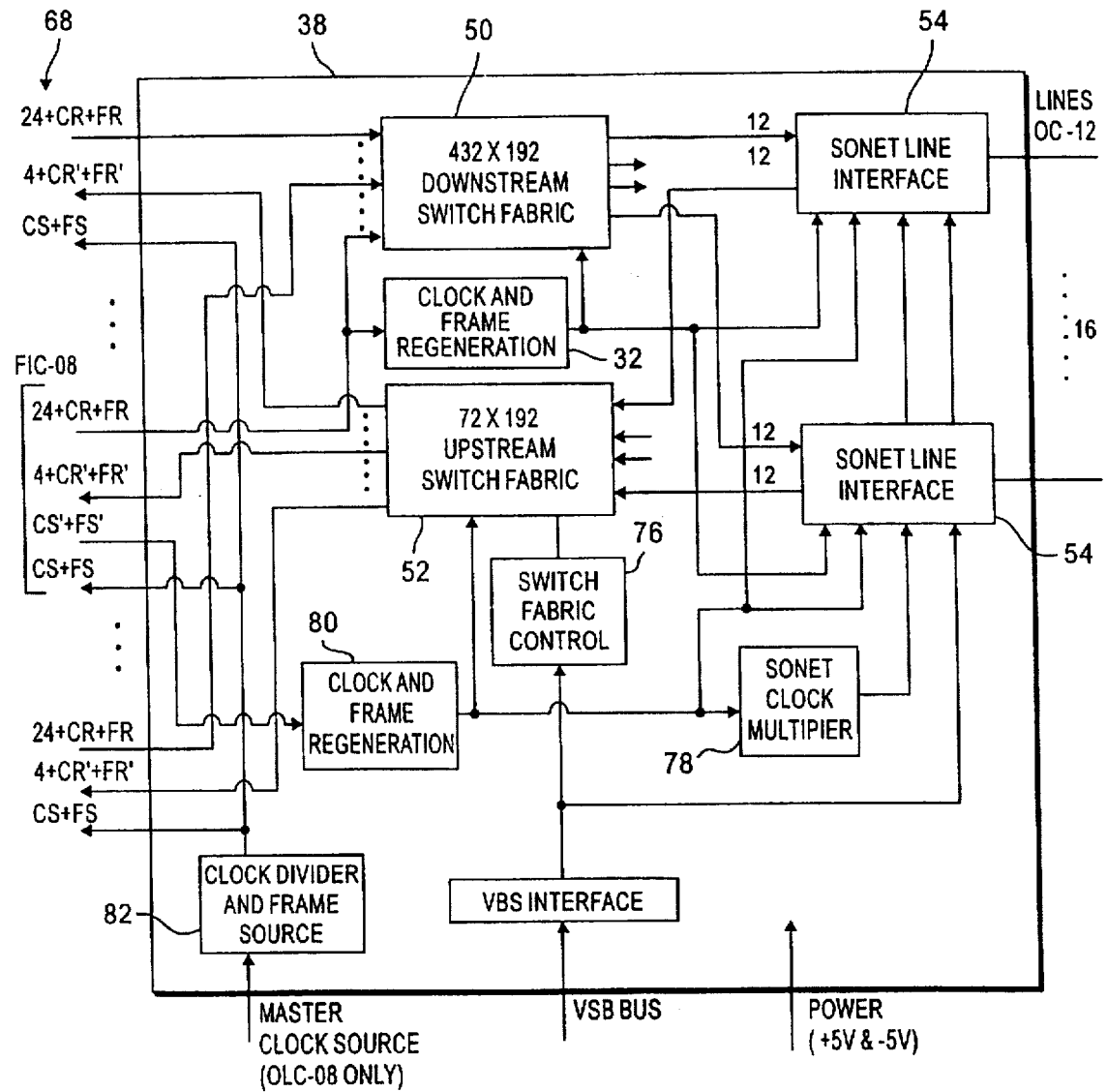
FIG. 6 shows a block diagram of an optical line card (OLC)

FIG. 6 presents a block diagram which illustrates an optical line card (OLC) 38 in more detail. Each OLC 38 may include several OC-12 SONET interfaces 54, up to 16 in the preferred embodiment, for connection to the lines. Interfaces 54 demultiplex STS-1 channels from the SONET lines, convert the data into electrical signals, and couple the received individual STS-1 channels to inputs of upstream switch fabric 52, which is configured as a 72×192 fabric in the preferred embodiment. Likewise, interfaces 54 multiplex electrical STS-1 channels received from downstream switch fabric 50 onto the optical SONET lines. Downstream switch fabric 50 is configured as a 432×192 fabric in the preferred embodiment. Output signals from upstream switch fabric 52 are routed through junctor groups 68, through which they pass to all FICs 36 (see FIG. 4). Input signals from FICs 36 couple through junctor groups 68 to downstream switch fabric 50. The configuration of switching which occurs through fabrics 50 and 52 from moment to moment is controlled by a switch fabric control block 76, which is controlled by an OLC processor 58 (see FIG. 4).

A master clock source (not shown) connects only to the clock divider and frame source circuit 82 on the OLC 38 located in the middle of midplane assembly 34 (see FIG. 4). This centrally located OLC 38 is designated as OLC-08. Circuits 82 are inactive on all other OLCs 38. The master clock source may be synchronized to an external reference source, as is conventional for SONET equipment. Clock divider and frame source circuit 82 outputs a half-rate "clock source" signal CS and SONET "frame source" signal FS to all FICs 36 via the appropriate junctor groups. The SONET frame source signal is used to synchronize when all SONET frames are output from the B-CSM 20 and its position is otherwise arbitrary.

Clock and frame regeneration circuits 74 (see FIG. 5) on all FICs 36 receive the clock source CS and frame source FS signals from OLC-08. On each FIC 36, clock and frame regeneration circuit 74 provides both full rate and half-rate clocks and a frame reference signal (FR), which are distributed to all SONET receivers 42, to downstream switch fabric 46, and to a SONET-clock multiplier 72.

SONET receivers 42 use the full rate clock and the frame reference signal to input or otherwise extract data from SONET OC-12 fibers. As one skilled in the art would understand, SONET pointer-processing functions are done on each STS-1 signal using the frame and pointer as received and the frame reference signal.

Downstream switch fabric 46 uses the full-rate clock to clock-in data from the SONET receivers 42 and to clock it out to OLCs 38 via junctor groups 68. Fabric 46 also distributes the half-rate clock reference signal CR and the frame reference signal FR along with data to each OLC 38 that is connected to its output. The CR, FR and data signals which connect to each OLC are aligned as they leave the downstream switch fabric 46.

SONET clock multiplier 72 multiplies the STS-1 full-rate clock by 12 to give a 622.08 MHz clock which is provided to all SONET transmitters 44. One skilled in the art will understand that SONET transmitters 44 are designed so that the phase of this 622.08 MHz clock can be any stable value.

On the FIC 36 located in the middle of the midplane assembly, designated as FIC-08, clock and frame regeneration circuit 74 also provides half-rate clock CS' and frame source FS' signals to all OLCs 38 via the appropriate junctor groups 68.

Referring to FIG. 6, a clock and frame regenerate circuit 80 on each OLC 38 receives clock source CS' and frame source FS' signals from FIC-08. On an OLC 38, clock and frame regeneration circuit 80 provides both full-rate and half-rate clocks and a frame reference signal, which are distributed to the receivers in all SONET line interfaces 54, to the upstream switch fabric 52, and to a SONET clock multiplier 78.

Receivers (not shown) in SONET line interfaces 54 use the full rate clock and the frame reference signal to receive or otherwise extract data from SONET OC-12 lines. Those skilled in the art will understand that SONET pointer-processing functions are done on each STS-1 signal using the frame and pointer as received and the frame reference signal.

Upstream switch fabric 52 uses the full rate clock to clock-in data from the receiver in the SONET line interfaces 54 and to clock data out to FICs 36 via junctor groups 68. Upstream switch fabric 52 also distributes the half-rate clock reference signal CR' and the frame reference signal FR' along with data to each FIC 36 which is connected to its output. The CR', FR' and data signals which connect to each FIC 36 are aligned as they leave the upstream switch fabric.

SONET clock multiplier 78 multiplies the full rate clock by 12 to give a 622.08 MHz clock which is provided to all transmitters (not shown) in SONET line interfaces 54. As one skilled in the art can understand, the SONET transmitter are designed so that the phase of this 622.08 MHz clock can be any stable value.

Downstream data signals are input to the B-CSM 20 at SONET receiver 42 on FICs 36 (see FIG. 5), switched first by downstream switch fabrics 46 on FICs 36, switched second by downstream switch fabrics 50 on OLCs 38 (see FIG. 6), and then output from the B-CSM 20 by transmitters in SONET line interfaces 54 on OLCs 38.

In a similar manner, upstream data signals are input to the B-CSM 20 at receivers in the SONET line interfaces 54 on OLCs 38 (see FIG. 6), switched first by upstream switch fabrics 52 on OLCs 38 switched second by upstream switch fabrics 48 on FICs 36 (see FIG. 5), and then output from the B-CSM 20 by SONET transmitter 44 on FICs 36.

Only the processing of downstream data signals will be described below in detail; however, those skilled in the art will understand that the processing of upstream data is done in a similar manner. Referring to FIG. 5, downstream data signals are transferred on each FIC 36 from a SONET receiver 42 to downstream switch fabric 46 using the full rate clock from clock and frame regeneration circuit 74. Downstream data signals are transferred from all downstream switch fabrics 46 on all FICs 36 via junctors to all downstream switch fabrics 50 on all OLCs 38 (see FIG. 6).

Referring to FIG. 6, on each OLC 38 clock and frame regeneration circuit 32 receives the half-rate clock reference signal CR and frame reference signal FR from FIC-08. Circuit 32 regenerates these signals and outputs a full-rate clock and a frame reference signal to downstream switch fabric 50 and to transmitters in all SONET line interfaces 54. Downstream switch fabric 50 uses the full-rate clock to clock-in data from the FICs 36 via the junctors. Transmitters in SONET line interfaces 54 use the full-rate clock to clock-in data from the downstream switch fabric and they use the frame reference signal to set their SONET output framing. Thus, the downstream data signals are transferred on each OLC 38 from downstream switch fabric 50 to all transmitters in SONET line interfaces 54 using the full rate clock from clock and frame regeneration circuit 32.

When downstream data signals are transferred from all downstream switch fabrics 46 in FICs 36 via junctors to a downstream switch fabric 50 on an OLC 38, data signals are aligned with the clock reference signal CR at the input to the downstream switch fabric 50, even though the data and clock reference signals may have traversed different path lengths between the fabrics. Geometric compensation is used to assure that all data signals are aligned with the clock reference signal CR by assuring that the path length for each data or clock signal back to the master clock source is substantially the same.

Figure 7:
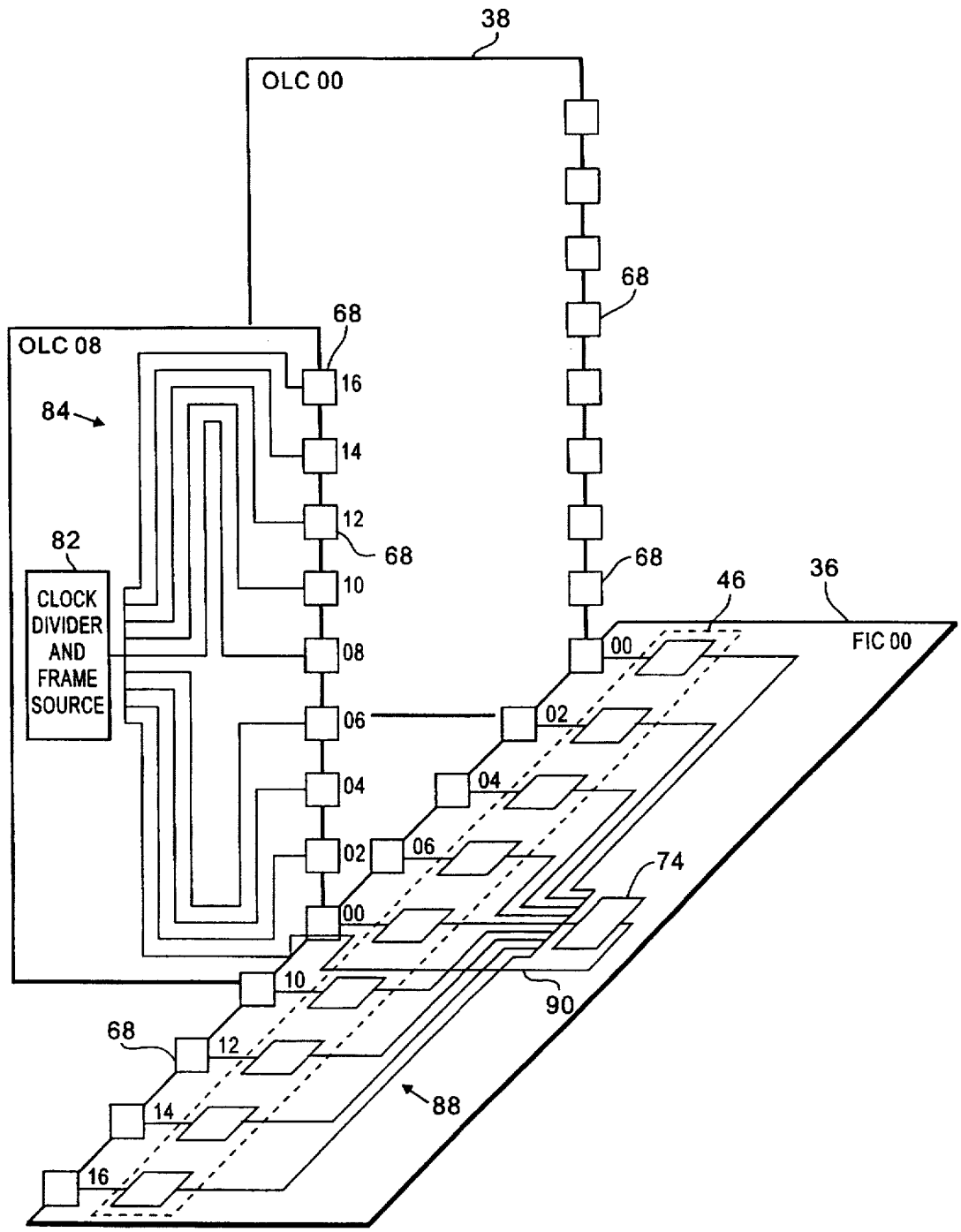
FIG. 7 shows a schematic representation of geometric compensation applied to reference clock signals in optical line cards and feeder interface cards for downstream switching.
Figure 8:
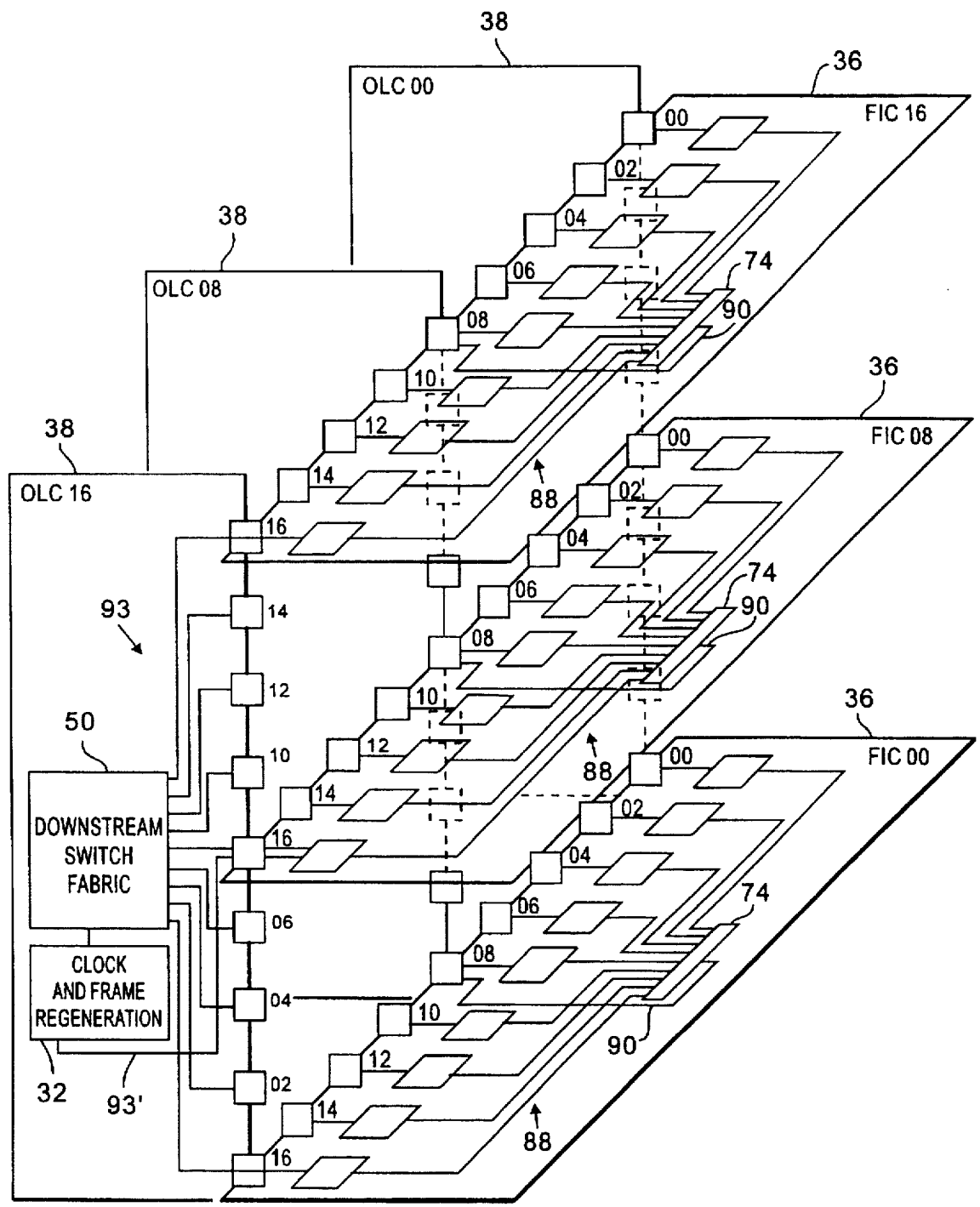
FIG. 8 shows a schematic representation of geometric compensation applied to data signals in feeder interface cards and optical line cards for downstream switching.

FIGS. 7 and 8 show a schematic representation of geometric compensation applied to signals in OLCs 38 and FICs 36 for downstream switching. For the sake of clarity, FIGS. 7 and 8 omit a similar representation which is employed in reverse for upstream switching. However, those skilled in the art will appreciate that the below-presented discussion which applies to downstream switching applies in reverse to upstream switching.

The purpose of the geometric compensation is to align the reference clock to corresponding data so that a regenerated master clock will have the correct phase synchronization to appropriately clock data into second stage fabrics and subsequent latches. All data and reference clock signals are desirably transported through OLCs 38 and FICs 36 using a 50 ohm trace configuration. To preserve noise immunity and reduce power consumption, accessory source and/or destination termination networks are omitted. The data or reference clocks propagate through these signal paths at around the speed of light, and signal paths of varying lengths lead to propagation delays of varying duration.

A master clock source starts at a physical point within B-CSM 20 and is be distributed throughout B-CSM 20 to the various locations where it then mates with data. As discussed above, the master clock is first converted to a one-half frequency reference clock signal which is distributed throughout B-CSM 20, then regenerated. Due to the vast amount of data processed by B-CSM 20, these locations are spread throughout B-CSM 20, so that varying amounts of propagation delay may be experienced by reference clocks just in transporting the reference clocks to locations where they mate with data. Likewise, the data passing between first and second stage switch fabrics may traverse signal paths of varying lengths. Consequently, data streams being collected together in second stage switch fabrics may have different timing skews associated therewith.

FIG. 7 illustrates a B-CSM 20 configured to support up to 9 FICs 36 and up to 9 OLCs 38. Each OLC 38 and FIC 36 is referenced using an even suffix number in the range of 00-16. However, FIG. 7 shows only OLC-00 and OLC-08 with FIC-00 for clarity. OLCs are aligned so that OLC-08 is in the center of all OLCS. Each OLC includes clock divider and frame source circuit 82 and signal path pattern 84, but circuit 82 and pattern 84 are active only on OLC-08. Pattern 84 distributes the clock source signal CS from clock divider and frame source circuit 82 to all junctor groups 68 through signal paths of varying lengths in pattern 84. In the version of pattern 84 illustrated in FIG. 7, the signal path to the center junctor group 68 for OLC-08 is the longest path, while the signal paths to the outside junctor groups 68 are the shortest signal paths.

Each FIC 36 includes a signal path pattern 90 and signal path pattern 88. Pattern 90 receives the clock source signal CS from OLC-08 via its center junctor group 68 and routes the clock source signal CS to clock divider and frame source circuit 74. Reference clocks which may be available at non-center junctor groups 68 on FICs 36 are ignored. Since FICs 36 are identical to one another, the reference clock follows equivalent length paths over path pattern 90 on all FICs 36. From clock and frame regeneration circuit 74, the clock source signal CS is distributed to all portions of downstream switch fabric 46 over signal path pattern 88. The downstream switch fabric 46 adds the data, and then the reference clock and data pass together from fabric 46 to junctor groups 68. Each FIC 36 has the same pattern 88.

FIG. 8 illustrates the same pattern 88 shown in FIG. 7 along with a pattern 93 residing on OLC cards 38. Pattern 84, discussed above in connection with FIG. 7 is omitted in FIG. 8 for clarity. Data from junctor groups 68 are routed to a downstream switch fabric 50 along signal paths of varying lengths following pattern 93. A reference clock from FIC-08 is routed using a signal pattern 93' to clock and frame regeneration circuit 32, which regenerates an aligned full-rate clock. At downstream switch fabric 50 the data are clocked into the switch fabric using the clock from clock and frame regeneration circuit 32. In the preferred embodiments, the delays of corresponding signal paths from patterns 84 and 93 approximately equal the same constant value for each junction group 68. The varying lengths of pattern 84 compensate for the varying lengths of pattern 93.

The clock path from clock divider and frame source circuit (see FIG. 6) 82 on OLC-08 (see FIG. 6) to the clock input at the downstream switch fabric 50 on a particular OLC 38 always includes patterns 84 on OLC-08, plus pattern 90 and 88 on FIC-08, plus pattern 93' on the particular OLC 38. The clock and data path from clock divider and frame source circuit 82 on OLC-08 to any data input at the downstream switch fabric 50 on a particular OLC 38 always includes patterns 84 on OLC-08, plus patterns 90 and 88 on the appropriate FIC 36, plus pattern 93 on the particular OLC.

Since the delays of the corresponding signal path from patterns 84 and 93' are always equal for each FIC, and since pattern 90 and 88 are the same on each FIC, the delays of all clock-only and clock and data paths are roughly equal.

In summary, the present invention provides an improved data transferring circuit which aligns a clock with data. This data transferring circuit may be implemented in a small space because clock recovery circuits need not be included for each data circuit and because power saving design techniques are used. The small space reduces the distance signals need to travel within the data transferring circuit and reduces the variation in timing associated with these signals. The data transferring circuit may operate at high data rates, such as STS-1 rates or other rates which serve the needs of a broadband switch. The data transferring circuit of the present invention serves as a broadband switch which may accommodate a large number of connections, and which accommodates simple and straight forward engineering.

The present invention has been described above with reference to preferred embodiments. However, those skilled in the art will recognize that changes and modifications may be made in these preferred embodiments without departing from the scope of the present invention. For example, the precise configuration of the preferred embodiment is discussed above for the sake of illustration, and those skilled in the art will recognize that the present invention can encompass a wide variety of configurations not specifically discussed herein. Moreover, the present invention is not limited to just the signals discussed herein. For example, SONET framing signals may be distributed with clock signals in the manner discussed above. These and other changes and modifications which are obvious to those skilled in the art are intended to be included within the scope of the present invention.

What is claimed is:

1. A data transferring circuit for maintaining alignment between clock and data, said circuit comprising:

input means for receiving first data at a data rate;

a clock source configured to provide a reference clock which oscillates at a frequency less than said data rate, said clock source being configured so that said reference clock oscillates at a frequency of approximately one half said data rate;

output means for presenting second data at substantially said data rate;

a data processor for transforming said first data and said reference clock into said second data and a second reference clock, respectively; and a clock regenerator, coupled to said data processor and said output means, for generating a clock signal which oscillates substantially at said data rate and is synchronized to said second reference clock, said clock signal being used to clock said second data into said output means.

2. A data transferring circuit for maintaining alignment between clock and data, said circuit comprising:

input means for receiving first data at a data rate;

5,796,795

11 a clock source configured to provide a reference clock which oscillates at a frequency less than said data rate;

output means for presenting second data at substantially said data rate;

a data processor for transforming said first data and said reference clock into said second data and a second reference clock, respectively, said data processor comprising a switch fabric having a first stage which is distributed among a plurality of first cards and a second stage which is distributed among a plurality of second cards, said first cards being oriented generally perpendicular to said second cards and each of said first cards coupling to all of said second cards; and a clock regenerator, coupled to said data processor and said output means, for generating a clock signal which oscillates substantially at said data rate and is synchronized to said second reference clock, said clock signal being used to clock said second data into said output means.

3. A circuit as claimed in claim 2 wherein:

said switch fabric provides downstream switching wherein signals arriving at said first cards are routed through said switch fabric and out of said second cards; and said circuit additionally comprises an upstream switch fabric distributed among said first and second cards so that each first card and each second card accommodate both upstream and downstream switching.

4. A circuit as claimed in claim 3 wherein said upstream and downstream switch fabrics are configured so that a greater number of downstream connections are accommodated than upstream connections.

5. A data transferring circuit for maintaining alignment between clock and data, said circuit comprising:

input means for receiving first data at a data rate;

a clock source configured to provide a reference clock which oscillates at a frequency less than said data rate;

output means for presenting second data at substantially said data rate;

a data processor for transforming said first data and said reference clock into said second data and a second reference clock, respectively, said data processor comprising a switch fabric having a first stage which is distributed among a plurality of first modules and a second stage which is distributed among a plurality of second modules, said first modules coupling to said second modules at connection, and said first modules being substantially identical to one another and said second modules being substantially identical to one another; and a clock regenerator, coupled to said data processor and said output means, for generating a clock signal which oscillates substantially at said data rate and is synchronized to said second reference clock, said clock signal being used to clock said second data into said output means.

6. A data transferring circuit for maintaining alignment between clock and data, said circuit comprising:

input means for receiving first data at a data rate;

a clock source configured to provide a reference clock which oscillates at a frequency less than said data rate;

output means for presenting second data at substantially said data rate;

a data processor for transforming said first data and said reference clock into said second data and a second

12 reference clock, respectively, said data processor being distributed among a plurality of first and second modules, said first and second modules coupling together at connection points, said reference clock being routed to connection points on one of said second modules through signal paths of varying lengths, and third data, which are responsive to said first data and are presented to said connection points from said first modules, are routed on each of said second modules from said connection points through signal paths of varying lengths, wherein said varying lengths of said third data signal paths compensate for said varying lengths of said reference clock signal paths; and a clock regenerator, coupled to said data processor and said output means, for generating a clock signal which oscillates substantially at said data rate and is synchronized to said second reference clock, said clock signal being used to clock said second data into said output means.

7. A circuit as claimed in claim 6 wherein:

said second modules are aligned relative to one another; and said one of said second modules on which said reference clock is routed is centrally located among said second modules.

8. A circuit as claimed in claim 6 wherein, for each of said connection points on said one of said second modules, the sum of the signal path length followed by said reference clock to said connection point plus the signal path length followed by said third data from said connection point approximately equals a constant length.

9. A circuit as claimed in claim 6 wherein:

in each first module said reference clock is routed from a connection point along a clock path to an area where said reference clock joins a portion of said first data; and said clock paths through said first modules have substantially equal lengths.

10. A circuit as claimed in claim 6 wherein:

within one of said first modules said reference clock is delayed through a plurality of data processor circuits to generate a plurality of second reference clocks;

each second reference clock is routed through a corresponding connection point to a corresponding second module;

in each second module, one of said second reference clocks is routed from a connection point along a second clock path to an area where said one second reference clock joins a portion of said third data; and said second clock paths have substantially equal lengths through said second modules.

11. A method of transferring data in synchronism with a master clock to maintain alignment between said master clock and said data, said method comprising the steps of:

receiving first data at a data rate;

generating a reference clock which is synchronized with said master clock and oscillates at a frequency less than said data rate;

transforming said first data and said reference clock into second data and a second reference clock, respectively said first data being configured as a plurality of first data portions, said second data being configured as a plurality of second data portions, and said transforming step comprises the step of switching said first data portions into said second data portions;

regenerating said master clock signal from said second reference clock; and using said regenerated master clock signal to clock said second data into a latch.

12. A method as claimed in claim 11 wherein said switching step comprises the steps of:

performing first stage switching in a first plurality of switching modules;

performing second stage switching in a second plurality of switching modules;

orienting said first modules generally perpendicular to said second modules; and coupling each of said first modules to all of said second modules.

13. A method as claimed in claim 11 wherein said switching step comprises the steps of:

performing first stage switching in a plurality of first switching modules, said first switching modules being substantially identical to one another;

performing second stage switching in a plurality of second switching modules, said second switching modules being substantially identical to one another; and coupling each of said first modules to all of said second modules.

14. A method of transferring data in synchronism with a master clock to maintain alignment between said master clock and said data, said method comprising the steps of:

receiving first data at a data rate;

generating a reference clock which is synchronized with said master clock and oscillates at a frequency less than said data rate;

transforming said first data and said reference clock into second data and a second reference clock, respectively said transforming step is performed throughout a plurality of first and second modules, said first and second modules coupling together at connection points;

routing said reference clock to connection points on one of said second modules through signal paths of varying lengths;

presenting third data to said connection points from said first modules, said third data being responsive to said first data; and routing said third data on each of said second modules from said connection points through signal paths of varying lengths, wherein said varying lengths of said third data signal paths compensate for said varying lengths of said reference clock signal paths;

regenerating said master clock signal from said second reference clock; and using said regenerated master clock signal to clock said second data into a latch.

15. A method as claimed in claim 14 additionally comprising the steps of:

aligning said second modules relative to one another; and selecting a centrally located one of said second modules for routing said reference clock to connection points through signal paths of varying lengths.

16. A method as claimed in claim 14 wherein, for each of said connection points on said one of said second modules, the sum of the signal path length followed by said reference clock to said connection point plus the signal path length followed by said third data from said connection point approximately equals a constant length.

17. A method as claimed in claim 14 additionally comprising the steps of:

routing said reference clock in each first module from a connection point along a clock path to an area where said reference clock joins a portion of said first data; and configuring said clock paths in said first modules to have substantially equal lengths.

18. A method as claimed in claim 14 wherein:

within one of said first modules said reference clock is delayed through a plurality of data processor circuits to generate a plurality of second reference clocks;

each second reference clock is routed through a corresponding connection point to a corresponding second module;

in each second module, said second reference clock is routed from a connection point along a second clock path to an area where said second reference clock joins a portion of said third data; and said second clock paths have substantially equal lengths through said second modules.

19. A data transferring circuit for maintaining alignment between clock and data, said circuit comprising:

input means for receiving first data at a data rate;

a clock source configured to provide a reference clock which oscillates at a frequency of approximately one half said data rate;

output means for presenting second data at substantially said data rate;

a switch fabric for switching said first data and said reference clock into said second data and a second reference clock, said switch fabric being configured to delay said first data to produce said second data and to delay said reference clock along with said first data to produce said second reference clock; and a clock regenerator, coupled to said switch fabric and said output means, for generating a clock signal which oscillates substantially at said data rate and is synchronized to said reference clock, said clock signal being used to clock said second data into said output means.

20. A data transferring circuit for maintaining alignment between clock and data, said circuit comprising:

input means for receiving first data at a data rate;

a clock source configured to provide a reference clock which oscillates at a frequency less than said data rate;

output means for presenting second data at substantially said data rate;

a switch fabric for switching said first data and said reference clock into said second data and a second reference clock, said switch fabric being configured to delay said first data to produce said second data and to delay said reference clock along with said first data to produce said second reference clock, said switch fabric being distributed among a plurality of first and second cards, said first cards being oriented approximately perpendicular to said second cards and positioned so that each first card couples to all second cards at connection points, and said reference clock being routed to connection points on one of said second cards through signal paths of varying lengths;

a clock regenerator, coupled to said switch fabric and said output means, for generating a clock signal which oscillates substantially at said data rate and is synchronized to said reference clock, said clock signal being used to clock said second data into said output means; and third data, which are responsive to said first data and are presented to said connection points from said first cards, are routed on each of said second cards from said connection points through signal paths of varying lengths, wherein said varying lengths of said third data signal paths compensate for said varying lengths of said reference clock signal paths.

21. A circuit as claimed in claim 20 wherein:

said switch fabric comprises a downstream switching portion through which signals arriving at said first cards are routed through said switch fabric and out of said second cards, said switch fabric comprises an upstream switching portion through which signals arriving at said second cards are routed through said switch fabric and out of said first cards; and said downstream and upstream switching portions of said switch fabric are each distributed among said first and second cards so that each first card and each second card accommodate both upstream and downstream switching.

22. A circuit as claimed in claim 20 wherein said first cards are substantially identical to one another and said second cards are substantially identical to one another.

23. A circuit as claimed in claim 20 wherein:

said second cards are aligned relative to one another; and said one of said second cards on which said reference clock is routed is centrally located among said second cards.

24. A circuit as claimed in claim 20 wherein, for each of said connection points on said one of said second modules, the sum of the signal path length followed by said reference clock to said connection point plus the signal path length followed by said third data from said connection point approximately equals a constant length.

25. A circuit as claimed in claim 20 wherein:

in each first card said reference clock is routed from a connection point along a clock path to an area where said reference clock joins a portion of said first data; and said clock paths through said first cards have substantially equal lengths.

26. A circuit as claimed in claim 20 wherein:

within one of said first cards said reference clock is delayed through a plurality of switch fabric circuits to generate a plurality of second reference clocks;

each second reference clock is routed through a corresponding connection point to a corresponding second card;

in each second card, one of said second reference clocks is routed from a connection point along a second clock path to an area where said one second reference clock joins a portion of said third data; and said second clock paths have substantially equal lengths through said second cards.

* * * * *

UNITED STATES PATENT AND TRADEMARK OFFICE
CERTIFICATE OF CORRECTION

PATENT NO : 5,796,795
DATED : August 18, 1998
INVENTOR(S) : Harry Edward Mussman et al.

It is certified that error appears in the above-identified patent and that said Letters Patent is hereby corrected as shown below:

Col. 11, line 48
replace "second modules at connection, and said first modules"
with --second modules at connection points, and said first modules--.

Signed and Sealed this

Eighth Day of December, 1998

Attest:

BRUCE LEHMAN

Attesting Officer

Commissioner of Patents and Trademarks